Figure 1:
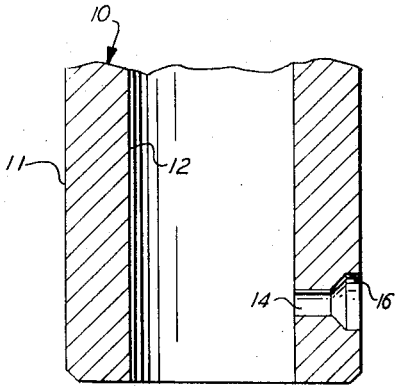
Figure 2:
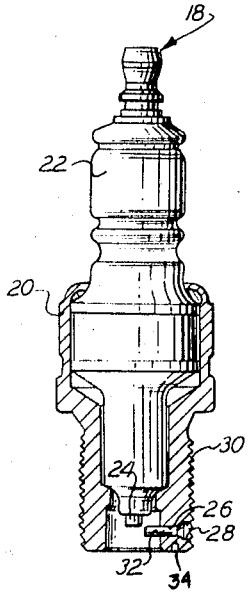

T866031

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1438

737,915
PROCESS FOR FORMING PASSAGES IN THREADED MEMBERS

Robert C. Johns, Fostoria, Ohio, assignor to Ford Motor Company, Dearborn, Mich., a corporation of Delaware

Filed June 18, 1968. Published Sept. 30, 1969
Int. Cl. H01t *13/00*
U.S. Cl. 29—25.12
1 Sheet Drawing. 4 Pages Specification

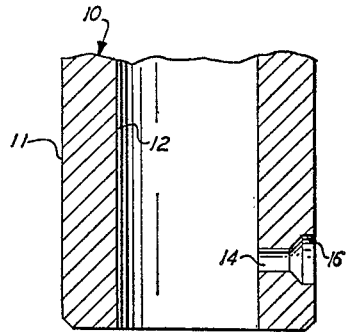

Shells of spark plugs intended to have staked side electrodes are drilled before threads are formed thereon and the passages are counterbored on the surface to be threaded. During thread rolling, metal is deformed into the counterbore but does not interfere with the size of the hole or produce burrs on the threads. The side electrode then can be located in the passage without interference from such deformed metal and the spark plug can be installed in an engine head made of soft metal such as aluminum without the risk of burrs or other irregularities destroying the corresponding threads in the head. In a typical spark plug having rolled 14 mm. threads, a counterbore 0.1285 inch in diameter and 0.030 inch deep for a passage 0.069 inch in diameter adequately absorbs metal deformed during thread rolling. The same procedure can be used wherever an accurate passage is desired in the threaded portion of a member.

Sept. 30, 1969 R. C. JOHNS 737 915 T866031 DEF. PUB.

PROCESS FOR FORMING PASSAGES IN THREADED MEMBERS

Filed June 18, 1968

ROBERT C. JOHNS
INVENTOR.

BY John R. Faulkner
Glenn A. Arendsen

ATTORNEYS